(12) United States Patent
Plett et al.

(10) Patent No.: US 12,552,610 B2
(45) Date of Patent: Feb. 17, 2026

(54) ADJUSTABLE BELT SEAL

(71) Applicant: Meridian Manufacturing Inc., Sunnyside (CA)

(72) Inventors: Samuel J. Plett, Sunnyside (CA); Adolf Loewen, Sunnyside (CA)

(73) Assignee: Meridian Manufacturing Inc., Sunnyside (CA)

( * ) Notice: Subject to any disclaimer, the term of this patent is extended or adjusted under 35 U.S.C. 154(b) by 52 days.

(21) Appl. No.: 18/606,930

(22) Filed: Mar. 15, 2024

(65) Prior Publication Data
US 2024/0317502 A1 Sep. 26, 2024

Related U.S. Application Data

(60) Provisional application No. 63/453,636, filed on Mar. 21, 2023.

(51) Int. Cl.
*B65G 21/20* (2006.01)

(52) U.S. Cl.
CPC .................. *B65G 21/2081* (2013.01)

(58) Field of Classification Search
CPC ............ B65G 21/2081; B65G 21/2072
USPC ........................................ 198/836.1
See application file for complete search history.

(56) References Cited

U.S. PATENT DOCUMENTS

| | | | |
|---|---|---|---|
| 3,024,893 A * | 3/1962 | Lambert | B65G 21/2081 198/836.1 |
| 4,641,745 A * | 2/1987 | Skates | B65G 21/2081 198/860.3 |
| 5,267,642 A * | 12/1993 | Gharpurey | B65G 21/2081 198/836.3 |
| 5,513,743 A | 5/1996 | Brink | |
| 5,774,951 A * | 7/1998 | Close | F16B 2/14 24/522 |
| 7,571,802 B2 | 8/2009 | Bowman | |
| 8,827,069 B2 | 9/2014 | Freehill et al. | |
| 9,567,161 B2 | 2/2017 | Holmberg | |
| 2002/0036043 A1* | 3/2002 | Victor Thielen | C08K 5/39 152/517 |
| 2002/0175050 A1* | 11/2002 | Wiggins | B65G 21/2081 198/525 |
| 2010/0230251 A1* | 9/2010 | Gaarden | B65G 21/2081 198/836.1 |

FOREIGN PATENT DOCUMENTS

| | | | | |
|---|---|---|---|---|
| EP | 0462847 A1 * | 12/1991 | | B65G 21/2081 |
| JP | H06115656 A | 4/1994 | | |
| JP | 2003252419 A * | 9/2003 | | B65G 21/2081 |
| KR | 100846666 B1 | 7/2008 | | |
| WO | 2022087693 A1 | 5/2022 | | |

OTHER PUBLICATIONS

JP translation (Year: 2025).*
JP 2003252419 translation (Year: 2025).*

* cited by examiner

*Primary Examiner* — Mark A Deuble
(74) *Attorney, Agent, or Firm* — GrowIP Law Group LLC

(57) ABSTRACT

A belt seal assembly for sealing against a travelling conveyor belt is described. The assembly includes a belt seal adjustably mounted to overlap an edge of the conveyor belt and a pressure plate adjustably mounted to apply pressure to the belt seal, to reduce bounce and ensure sealing of the belt seal against the conveyor belt.

12 Claims, 6 Drawing Sheets

ADJUSTABLE BELT SEAL

FIELD

The present disclosure relates to an adjustable belt seal assembly for use with a conveyor belt system, and methods of using the same.

BACKGROUND

Conveyor belts are well known for transporting granular materials. Conveyor belt systems typically comprise a travelling belt portion, carrying the granular material, and stationary sides between which the belt travels. Generally, seals are used to apply pressure to the conveyor belt to seal between the conveyor belt as it is travelling, and the stationary sides of the conveyor system. The stationary sides of conveyer systems used in the agricultural industry, for example, systems for conveying grain, are generally angled with respect to moving belt in order to keep the conveyed product on the conveyor belt and to maximize the width of the conveyor belt over which product can be spread, without losing product. This in turn maximizes production by the conveyor belt system.

Stationary sealing strips, also called flashings, are known and are configured to the stationary sides of the conveyer system. They are commonly made of rubber to allow flexibility. One problem is that past seals can pucker and wear over time from frictional contact with the moving conveyor belt. As well, in outdoor use, snow and ice can also cause puckering and wear to rubber sealing strips. Double flashings have been tried as well as lengthening the length of sealing strip/flashing to avoid these issues.

The sealing strip is typically slightly longer than the distance above the conveyor belt, which causes the sealing strip to curve, giving a larger surface area of contact. Because the sealing strip is made of a flexible material the sealing strip will naturally want to bounce back at the location where it curves from vertical to horizontal.

While the height of the sealing strip can sometimes be adjusted, there is still an issue of bounce of the sealing strip overall and more particularly at the curve of the strip. Examples of prior art systems include:

U.S. Pat. No. 7,571,802 teaches a conveyor belt assembly having a skirt with a leg member and a foot member, the foot of the skirt serving to engage against a conveyor belt and applying pressure thereto. The height of the skirt foot is adjustable by clamping members to clamp a top of the skirt leg.

U.S. Pat. No. 3,024,893 teaches a skirtboard and sealer for a conveyor system in which the skirt board assembly is connected to the conveyor frame and the frame includes a slot 18 that allows for vertical adjustment of the entire skirt board assembly.

U.S. Pat. No. 9,567,161 teaches a fastening device for securing a sealing member to a conveyor, including alignment apertures and a nut receiver formed in the fastening device that align with apertures in the sealing member, the nut receiver allowing for nuts to be held in place to connect the fastening device to the sealing member.

U.S. Pat. No. 5,513,743 teaches belt conveyor skirt seal arrangement a side wall of the conveyor loading chute and a skirt seal. The skirt seal includes a shield on its upper surface for engaging with side wall, for the purposes of preventing conveyed material from entering below the side wall. The skirt seal can be raised and lowered by brackets.

U.S. Pat. No. 8,827,069 teaches an extendable conveyor assembly of two conveyors with a seal connecting a side shield and a frame of the assembly.

WO2022/087693 teaches a containment guide and lateral seals for conveyor belts in which a flexible blade sealing element is mounted in a series of locking elements. Each locking element is adjustable to adjust pressure of the flexible blade sealing element on the belt.

JP 06115656 teaches a skirt part for a belt conveyor in which a skirt belt is held between a side plate and slide assembly. The slide assembly is connected to the side plate by brackets and allows for movement up and down of the skirt belt.

KR10084666 teaches a belt skirt for use with a conveyor belt made up of a first skirt portion that is clamped against a support plate by second skirt portion. The second skirt portion bends behind the first portion and forms a heel and a foot portion that contacts the conveyor. The height of first skirt and second skirt are adjustable.

SUMMARY

In accordance with the disclosure, there is provided a belt seal assembly for sealing against a travelling conveyor belt, the assembly including a belt seal adjustably mounted and configured to overlap and apply sealing pressure to an edge of the conveyor belt; and, a pressure plate adjustably mounted and configured to apply pressure to the belt seal, to reduce bounce and provide sealing of the belt seal against the conveyor belt.

In one embodiment, the belt seal further includes a leg portion, a heel portion and a toe portion and the pressure plate configured to apply pressure to the heel portion of the belt seal to reduce bounce at the heel portion.

In one embodiment, the belt seal includes slots for height and pressure adjustment of the belt seal on the conveyor belt.

In one embodiment, the pressure plate includes slots for height and pressure adjustment of the pressure plate against the belt seal.

In one embodiment, a width of the belt seal that overlaps the edge of the conveyor belt ranges from a full width of the toe section of the belt seal to a front edge of the belt seal.

In one embodiment, the pressure plate includes a contact edge for contacting and applying pressure to the belt seal, the contact edge having a profile selected from an angled profile, a blunt profile, a rounded profile or a flat extended profile.

There is also provided a method of sealing a belt seal against a conveyor belt. The method includes the steps of adjustably mounting the belt seal to overlap and apply sealing pressure to an edge of the conveyor belt; and applying pressure to the belt seal by lowering a pressure plate against the belt seal.

In one embodiment of the method, the belt seal includes a leg portion, a heel portion and a toe portion and the step of lowering the pressure plate applies pressure to the heel portion of the belt seal.

In one embodiment, the method includes the step of adjusting a height of the belt seal to thereby control pressure of the belt seal on the conveyor belt.

In one embodiment of the method includes the step of adjusting a height of the pressure plate to thereby control pressure of the pressure plate against the belt seal.

BRIEF DESCRIPTION OF THE DRAWINGS

Various objects, features and advantages of the disclosure will be apparent from the following description of particular embodiments of the disclosure, as illustrated in the accompanying drawings. The drawings are not necessarily to scale, emphasis instead being placed upon illustrating the principles of various embodiments of the disclosure. Similar reference numerals indicate similar components.

DETAILED DESCRIPTION

With reference to the figures, a belt seal assembly 100 for use with a conveyor belt assembly is described.

All terms have definitions that are reasonably inferable from the drawings and description.

Various aspects of the present disclosure will now be described with reference to the figures. For the purposes of illustration, components depicted in the figures are not necessarily drawn to scale. Instead, emphasis is placed on highlighting the various contributions of the components to the functionality of various aspects of the disclosure. A number of possible alternative features are introduced during the course of this description. It is to be understood that, according to the knowledge and judgment of persons skilled in the art, such alternative features may be substituted in various combinations to arrive at different embodiments of the present disclosure.

Rationale

The present adjustable belt seal assembly 100 includes a system of applying adjustable pressure to a seal of the seal assembly, and more preferably to a heel section of the seal to ensure sealing against a conveyor belt system 50. The present adjustable seal assembly includes a belt seal portion 10 and a pressure plate portion 20.

Typical Conveyor Belt System

Figure 1:
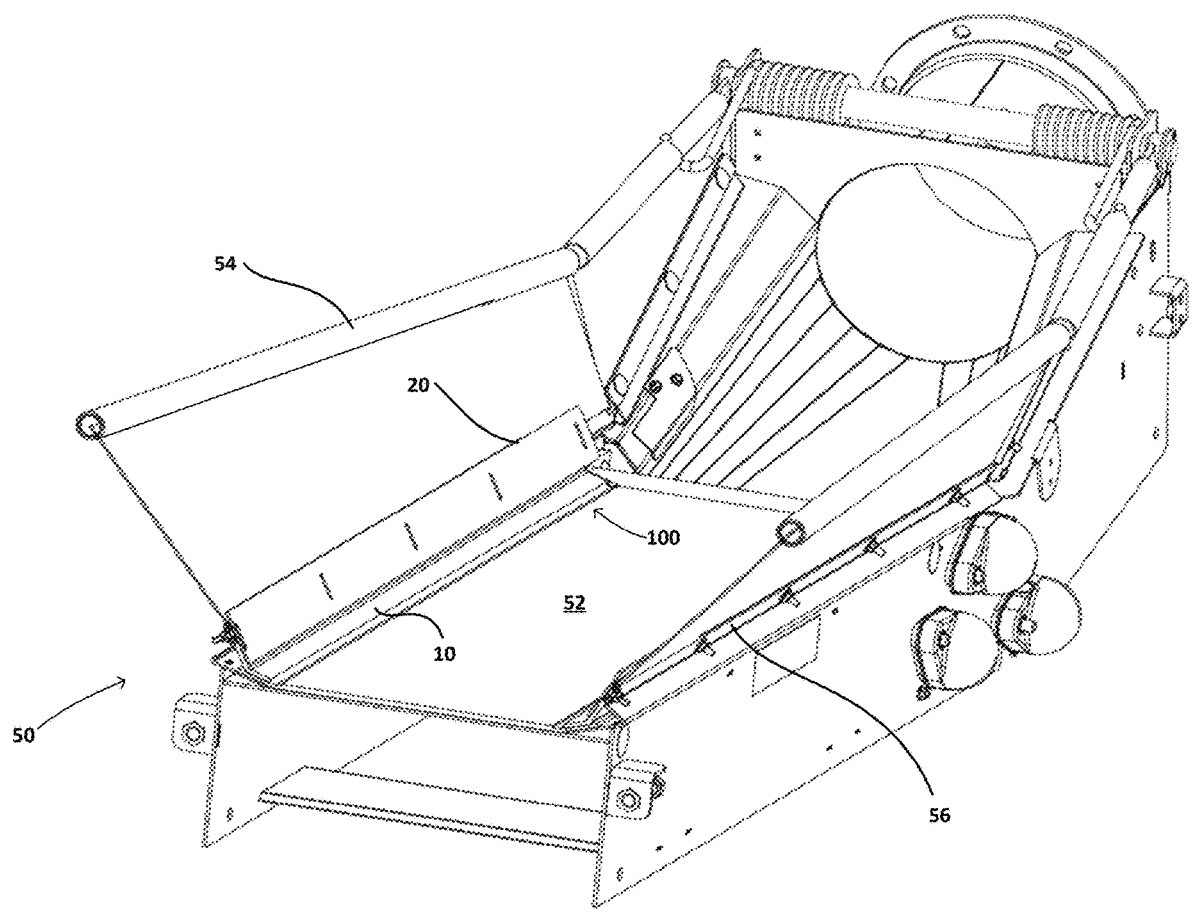
FIG. 1 is front-right perspective view of a conveyor belt system showing one embodiment of a belt seal assembly of the present disclosure.
Figure 2:
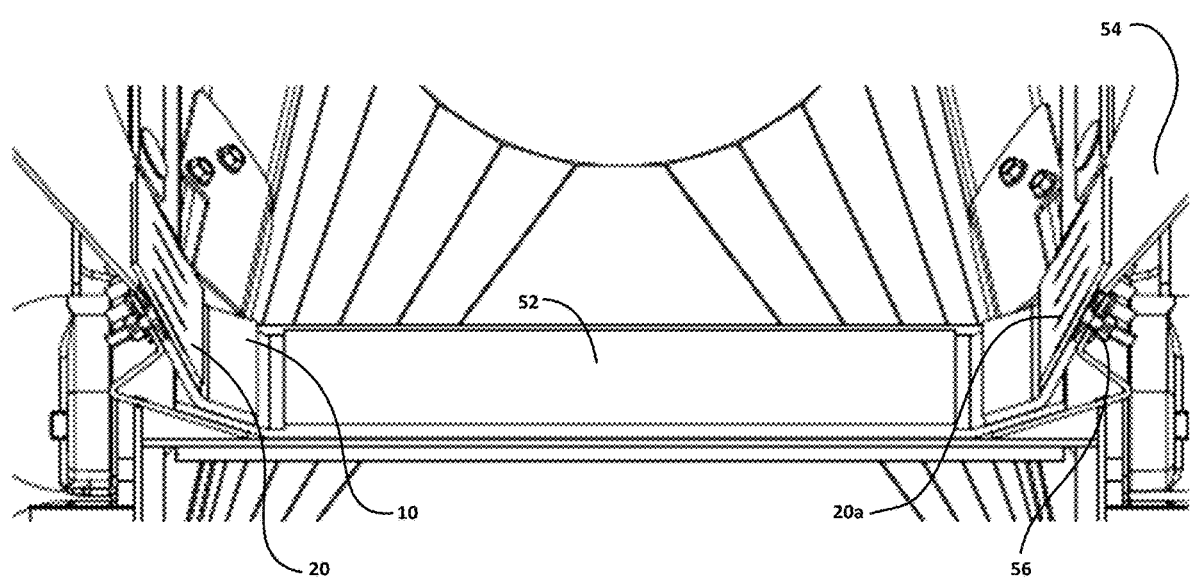
FIG. 2 is a front perspective view of the conveyor belt system and belt seal assembly of FIG. 1.
Figure 3A:
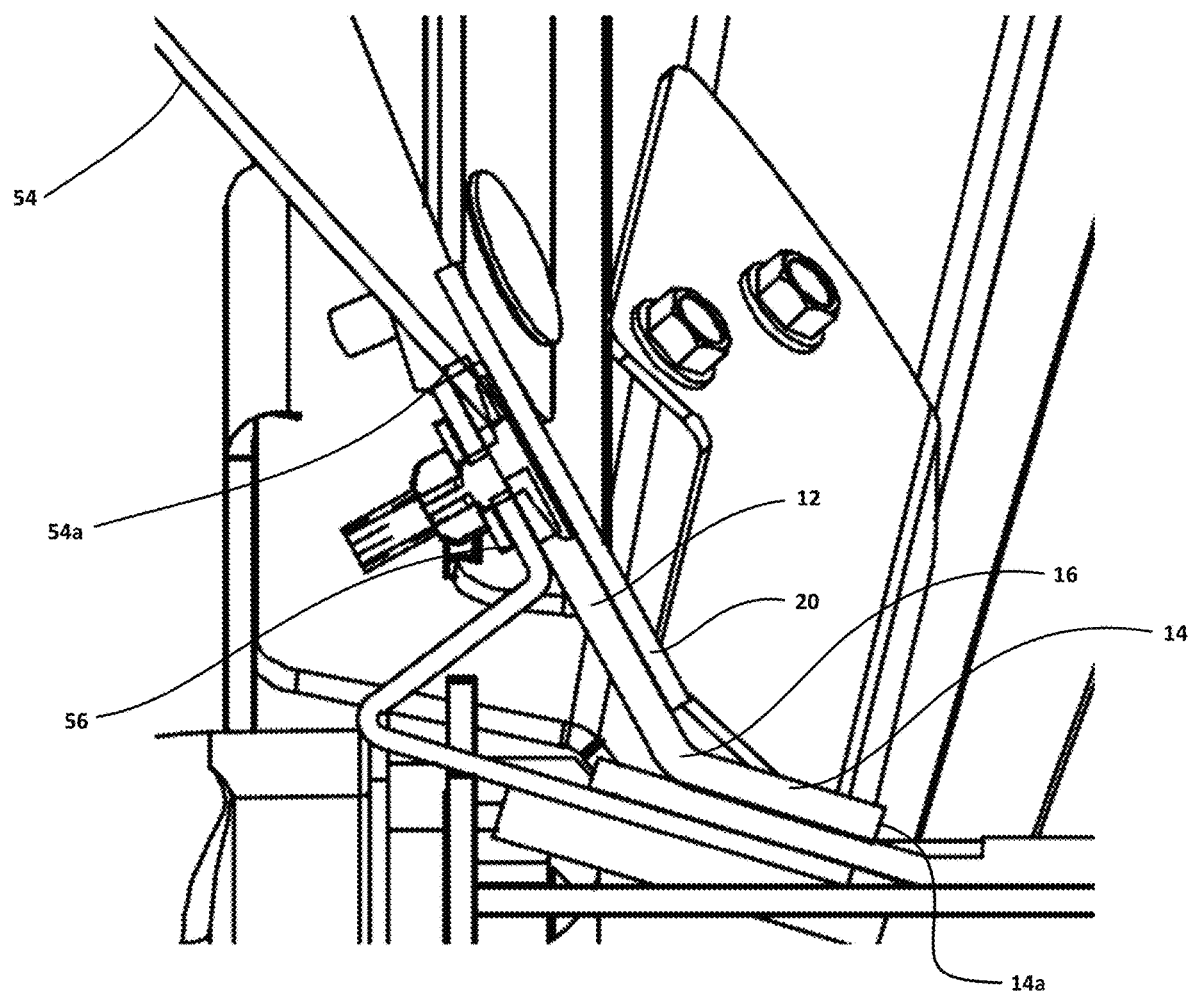
FIG. 3A is a detailed front elevation view of the belt seal assembly of FIG. 2.
Figure 3B:
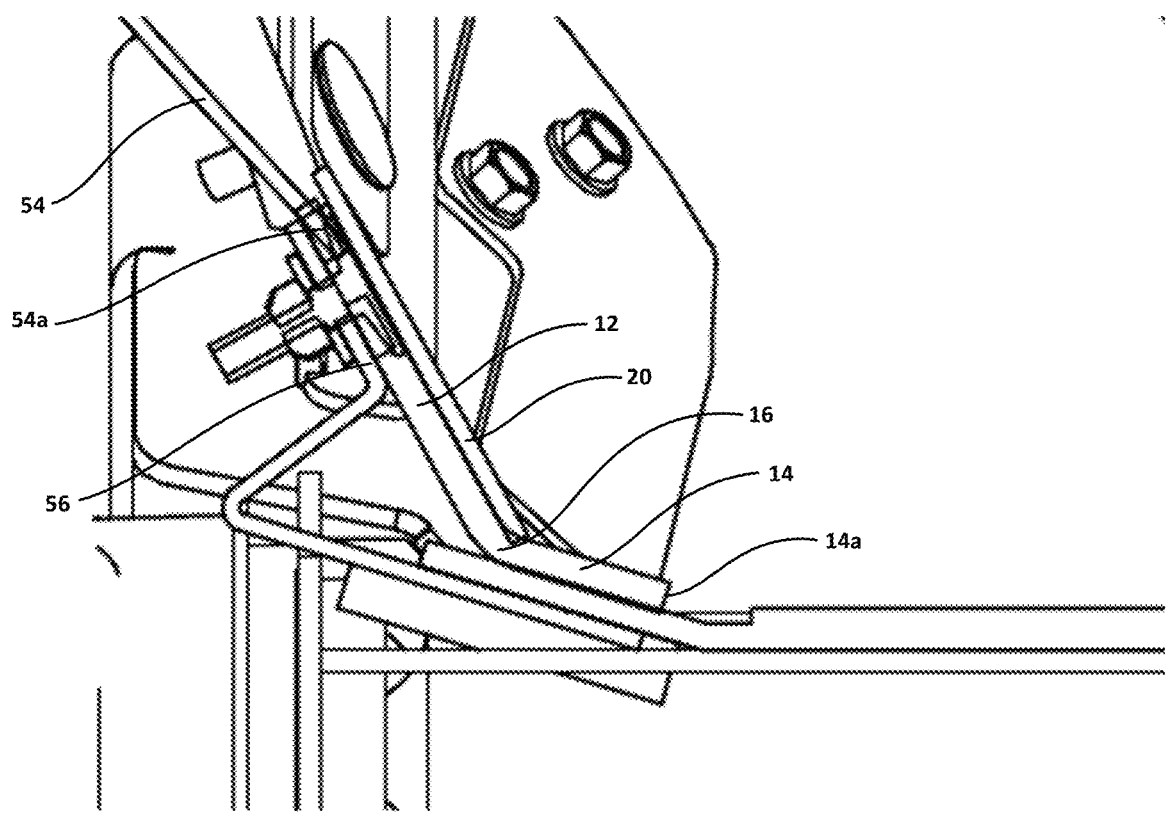
FIG. 3B is a detailed front elevation view of the belt seal assembly of FIG. 2, in a pressure plate lowered position.
Figure 4:
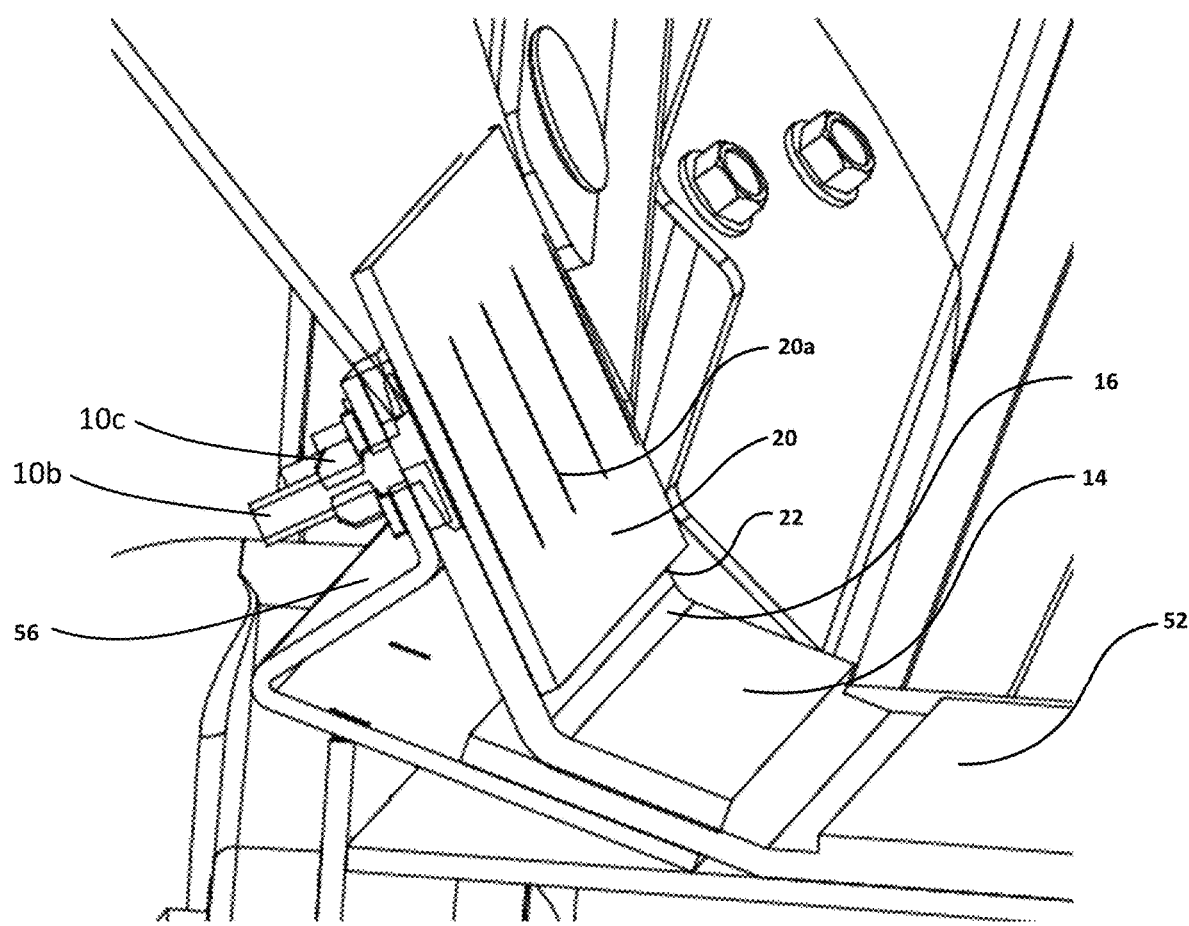
FIG. 4 is a detailed perspective view of the belt seal assembly of FIG. 3.

A typical conveyor belt system 50 for use with the present adjustable belt seal assembly 100 is shown in FIG. 1. The conveyor belt system 50 includes a moving conveyor belt 52 and stationary side walls 54. The stationary side walls 54 are commonly angled with respect to moving conveyor belt 52 in order to keep the conveyed product on the conveyor belt 52 and to maximize the width of the conveyor belt 52 over which product can be spread, without losing product. The sidewalls are configured to the system by any suitable means including bolts as shown in the figures.

Belt Seal Assembly—Seal Portion

Figure 5:
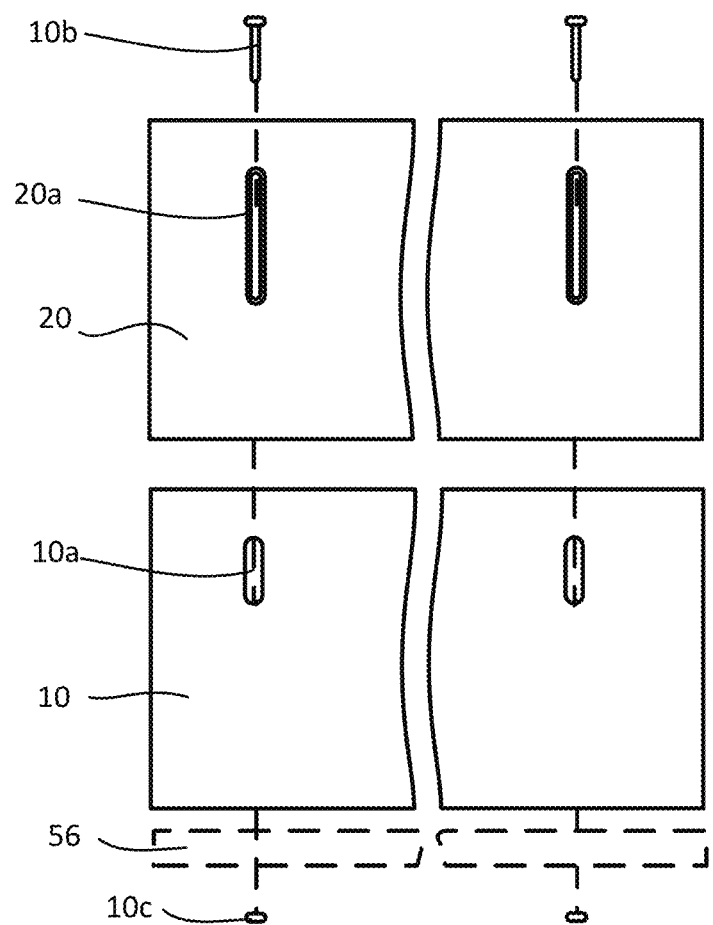
FIG. 5 is an exploded view of sections of one embodiment of the belt seal assembly of the present disclosure.

With reference to FIG. 5, a belt seal portion 10 of the belt seal assembly 100 includes holes or slots 10a that allow for a height of the belt seal 10 to be positioned relative to the conveyor belt 52 to allow for adjusting of the pressure applied by the belt seal 10 against the conveyor belt. The belt seal 10 can be secured to the mounting flange 56 of the conveyor belt system 50 by means of bolts 10b that pass through slots 10a and are secured by nuts 10c. In the mounted position, the belt seal and overlays an edge of the conveyor belt 52. This overlap can be in the range of about 1-1.5" of the belt seal 10 over the conveyor belt 52, to provide an effective seal.

The belt seal 10 can take any known configuration or format, but is commonly in the form of an elongate, flexible strip having a first side length which includes the holes or slots 10a for mounting to the mounting flange and a second side length of which seals against the moving conveyor belt 52.

In the embodiments illustrated, as the flexible belt seal 10 overlays onto and seals against the conveyor belt 52 it may bend along its length. However, it is also possible for the belt seal 10 to overlay the conveyor belt in any number of configurations with no bend present.

In a preferred embodiment and as illustrated, the belt seal 10 comprises a leg portion 12, through which slots 10a are located for screwing into the mounting flange 56. Slots 10a allow for raising and lower of the belt seal 10 against the conveyor belt 52. The belt seal 10 also includes a toe portion 14 that is biased against the underlying conveyor belt 52 with a degree of flexibility. A heel portion 16 of the belt seal 10 is defined where the leg portion 12 and the toe portion 14 meet. In this arrangement, the sealing force of the belt seal 10 is strongest or tightest at its heel portion 16.

The present belt seal 10 can be rubber but could also be made from any number of different flexible materials.

While the Figures show the belt seal 10 as being in contact with a shaved or reduced thickness portion of the conveyor belt 52, this is not a requirement, and the belt seal 10 could also instead contact a non-shaved portion of the conveyor belt 52.

While the figures illustrate a full width of the toe section 14 of the belt seal 10 being in contact with conveyor belt 52, it is also possible for any portion of the width of the toe section 14, or just a front edge 14a of the toe section 14, to be in contact with the conveyor belt 52. As mentioned above it is also possible for the belt seal 10 to have no bend or heel at all.

As well, while the front edge 14a of the toe section 14 is shown as blunt in the Figures, it would be understood by a person of skill in the art that the front edge 14 can be rounded, angled or otherwise profiled to maximize seal against a surface of the conveyor belt 52.

Belt Seal Assembly—Pressure Plate Portion

A pressure plate 20 includes slots 20a such that the pressure plate 20 can be screwed onto the mounting flange 56 over the belt seal 10 by means of bolts 10b that pass through slots 20a and nuts 10c for securing the bolts 10b. The slots 20a allow for a height of the pressure plate 20 to be adjusted to adjust the pressure applied by the pressure plate against the belt seal 10 in generally, and more preferably against the heel 16 of the belt seal 10, thereby reducing the seal's tendency to bounce. The pressure plate 20 can be adjusted and lowered further onto the heel 16 or onto the belt seal 10 in general, to compensate for conveyor belt 52 wear, belt seal 10 wear or other factors. The pressure plate 20 can be made of steel or any other suitably rigid material.

The angle of the pressure plate 20 relative to the belt seal can be any angle so long as it provides sufficient downwards force on the belt seal. In the embodiment illustrated in FIGS. 1 to 4, the angle of the pressure plate 20 relative to the toe portion 14 of the belt seal 10 can be any angle so long as it provides sufficient downwards force on the heel 16 of the belt seal 10. Preferably the angle of the pressure plate 20 relative the toe portion 14 is the same as the angle of the leg portion 12 of the belt seal 10 relative to the toe portion 14.

While illustrated as having a blunt contact edge 22, the contact edge 22 of pressure plate 20 can have any number of different profiles to maximize contact with the belt seal 10 or with a heel portion 16 of the belt seal 10. This may include an angled profile of contact edge 22 or contact edge 22 may have a rounded bead or flat extended profile.

The angle of the pressure plate 20 is not required to be the same as the angle of the stationary side walls 54. In an embodiment in which the stationary side wall 54 is also mounted to the conveyor belt system 50 by mounting flange 56, the angle of the pressure plate 20 and the stationary side wall 54 can be similar, or, as illustrated in the Figures, stationary side wall 54 may have a bend 54a formed therein to allow for a change in angle. Stationary sidewalls 54 can be flexible, or they can be rigid.

Operation

Height adjustment of the pressure plate 20 serves to apply a downwards force to the belt seal 10, and in some preferred embodiments to a heel portion 16 of the belt seal 10 in particular. This is separate and additional to any height adjustment of the belt seal 10 itself, which is provided by belt seal slots 10a.

By active and positive application of pressure to the belt seal, and more preferably, to a heel portion 16 of the belt seal 10 by the pressure plate 20, bounce is reduced and constant seal can be provided to ensure maximum usage of the conveyor belt 50 surface without product losses.

In the present belt seal assembly 100, the belt seal portion 10, pressure plate portion 20 and mounting flange 56 are all visible to an operator. This allows operators to readily visually check if the belt seal 10 is intact or if there is wear to the seal 10 or debris present or weather. Further, the pressure plate 20 can be adjusted without dismantling any parts of the assembly, since both the pressure plate 20 and its mounting location to the mounting flange 56 are readily visible and accessible.

While the figures illustrate the sidewalls 54 as being located between the mounting flange 56 and the belt seal 10, it would be well understood by a person of skill in the art that the sidewalls 54 can be located on an opposite side of the pressure plate 20, making the order of elements: mounting flange 56, belt seal 10, pressure plate 20 and sidewalls 54. Such arrangement would not affect access to adjustment of the pressure plate 20, since such adjustment is done via the mounting flange, which is still visible and accessible in this arrangement.

Although the present disclosure has been described and illustrated with respect to preferred embodiments and preferred uses thereof, it is not to be so limited since modifications and changes can be made therein which are within the full, intended scope of the disclosure as understood by those skilled in the art.

The invention claimed is:

1. A belt seal assembly for sealing against a travelling conveyor belt, said assembly comprising:
    a) a belt seal adjustably mounted and configured to overlap and apply sealing pressure to an edge of the conveyor belt; and
    b) a pressure plate adjustably mounted and configured to apply pressure to the belt seal and provide sealing of the belt seal against the conveyor belt, wherein the pressure plate comprises slots for height adjustment of the pressure plate against the belt seal;
    wherein the belt seal comprises a leg portion, a heel portion and a toe portion and wherein the pressure plate is configured to apply pressure to the heel portion of the belt seal.

2. The belt seal assembly of claim 1 wherein the belt seal comprises slots for height and pressure adjustment of the belt seal on the conveyor belt.

3. The belt seal assembly of claim 1 wherein the pressure plate comprises slots for height and pressure adjustment of the pressure plate against the belt seal.

4. The belt seal assembly of claim 1 wherein a width of the belt seal that overlaps the edge of the conveyor belt ranges from a full width of the toe section of the belt seal to a front edge of the belt seal.

5. The belt seal assembly of claim 1 wherein the pressure plate includes a contact edge configured to contact and apply pressure to the belt seal, said contact edge having a profile selected from an angled profile, a blunt profile, a rounded profile or a flat extended profile.

6. The belt seal assembly of claim 1 wherein the belt seal comprises slots for height and pressure adjustment of the belt seal on the conveyor belt.

7. The belt seal assembly of claim 6 wherein a width of the belt seal that overlaps the edge of the conveyor belt ranges from a full width of the toe section of the belt seal to a front edge of the belt seal.

8. The belt seal assembly of claim 7 wherein the pressure plate includes a contact edge configured to contact and apply pressure to the belt seal, said contact edge having a profile selected from an angled profile, a blunt profile, a rounded profile or a flat extended profile.

9. A method of sealing a belt seal against a conveyor belt, said method comprising the steps of:
    a) adjustably mounting the belt seal to overlap and apply sealing pressure to an edge of the conveyor belt;
    b) applying pressure to the belt seal by lowering a pressure plate against the belt seal, wherein the pressure plate comprises slots for height adjustment of the pressure plate against the belt
    c) adjusting a height of the pressure plate to thereby control pressure of the pressure plate against the belt seal.

10. The method of claim 9, wherein said belt seal comprises a leg portion, a heel portion and a toe portion and wherein lowering the pressure plate applies pressure to the heel portion of the belt seal.

11. The method of claim 9, further comprising adjusting a height of the belt seal to thereby control pressure of the belt seal on the conveyor belt.

12. The method of claim 10, further comprising adjusting a height of the belt seal to thereby control pressure of the belt seal on the conveyor belt.

\* \* \* \* \*